United States Patent
Greenland et al.

(10) Patent No.: US 10,948,702 B2
(45) Date of Patent: Mar. 16, 2021

(54) UNOBSCURED TWO-MIRROR CATADIOPTRIC OPTICAL SYSTEM FOR A MULTISPECTRAL IMAGING APPARATUS

(71) Applicant: Northrop Grumman Systems Corporation, Falls Church, VA (US)

(72) Inventors: Alan Greenland, Palatine, IL (US); Robin Pruss, Streamwood, IL (US); Christopher Jelen, Weston, WI (US); Matthew Larsen, Hawthorn Woods, IL (US); Shu-i Wang, Winfield, IL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/459,693

(22) Filed: Jul. 2, 2019

(65) Prior Publication Data
US 2021/0003833 A1    Jan. 7, 2021

(51) Int. Cl.
*G02B 17/08* (2006.01)
*G02B 27/10* (2006.01)
*G01J 3/28* (2006.01)
*G02B 27/09* (2006.01)

(52) U.S. Cl.
CPC ........ *G02B 17/0896* (2013.01); *G01J 3/2823* (2013.01); *G02B 27/1006* (2013.01); *G01J 2003/2826* (2013.01); *G02B 27/0983* (2013.01)

(58) Field of Classification Search
CPC ............ G02B 17/0896; G02B 27/1006; G02B 27/0983; G01J 3/2823; G01J 2003/2826
See application file for complete search history.

(56) References Cited

U.S. PATENT DOCUMENTS

| 4,265,510 | A | 5/1981 | Cook |
| 5,748,365 | A * | 5/1998 | Chen ...................... G02B 13/22 359/366 |
| 5,841,574 | A | 11/1998 | Willey |
| 6,174,061 | B1 * | 1/2001 | Cooper .................. G02B 13/14 359/366 |
| 6,288,781 | B1 * | 9/2001 | Lobb ........................ G01J 3/14 356/326 |
| 7,248,401 | B2 | 7/2007 | Bryant |
| 7,545,562 | B2 | 6/2009 | Chen et al. |
| 7,602,548 | B2 | 10/2009 | Thorwirth et al. |
| 7,616,378 | B2 | 11/2009 | Wang |
| 7,952,688 | B2 | 5/2011 | Paiva et al. |

(Continued)

OTHER PUBLICATIONS

Gelles, "Unobscured-aperture Two-mirror Systems", Journal of the Optical Society of America, vol. 65, No. 10, Oct. 1975, pp. 1141-1143.

(Continued)

*Primary Examiner* — Jamil Ahmed
(74) *Attorney, Agent, or Firm* — Edell, Shapiro & Finnan, LLC

(57) ABSTRACT

An optical system in which an aggressively compact reflective front end is combined with beam splitting elements and refractive relay optics to allow several imaging systems working in widely different wavelength bands to share a common aperture. The aggressively compact design results in significant field curvature at the uncorrected intermediate or virtual focus, which is corrected in the refractive relay optics for each band's imaging path.

20 Claims, 3 Drawing Sheets

(56) References Cited

U.S. PATENT DOCUMENTS

| | | | |
|---|---|---|---|
| 8,179,616 B1 * | 5/2012 | Hsu | G02B 9/34 |
| | | | 359/715 |
| 8,331,032 B2 | 12/2012 | Heimer | |
| 8,665,421 B1 | 3/2014 | Owen, III et al. | |
| 8,947,778 B2 | 2/2015 | Horton | |
| 9,400,210 B2 | 7/2016 | Sagan | |
| 2007/0253057 A1 * | 11/2007 | Potsaid | G02B 21/002 |
| | | | 359/384 |
| 2008/0186568 A1 * | 8/2008 | Chen | G01S 7/4812 |
| | | | 359/366 |
| 2018/0373005 A1 * | 12/2018 | Cappiello | G02B 23/02 |

OTHER PUBLICATIONS

Rutten, Harrie G.J. et al., "The Houghton Telescope: An Optimum Compromise?", The World of Unobstructed Reflecting Telescopes, Journal of the Amateur Telescope Makers 1, Fall 1992 (18 pages.).

Kutter, Anton, "The Schiefspiegler (Oblique Telescope)", Sky and Telescope Bulletin A, Sky Publishing Corporation, Massachusetts, http://users.telenet.be/philipdo/KutterBulletin-A.htm, accessed online on Feb. 25, 2019 (20 pages.).

"Two-mirror tilted component telescopes," https://www.telescope-optics.net_tilted_component_telescopes.htm, accessed online on Feb. 25, 2019 (8 pages.).

* cited by examiner

UNOBSCURED TWO-MIRROR CATADIOPTRIC OPTICAL SYSTEM FOR A MULTISPECTRAL IMAGING APPARATUS

FIELD OF THE INVENTION

This disclosure relates generally to a multispectral imaging apparatus and, more particularly, to an unobscured two-mirror catadioptric optical system for a multispectral imaging apparatus.

BACKGROUND

Various types of optical designs are known for observing distant objects. A first type of optical design utilizes refractive elements (i.e., lenses). However, optical designs consisting only of refractive elements have chromatic aberrations (i.e., the index of refraction varies with wavelength) that are difficult to correct, so it is difficult to have widely different wavelength bands use a common shared aperture in an all-refractive optical design. Also, most optical substrate (i.e., lens) materials transmit light only within specific wavelength ranges. For example, there are very few materials that can transmit in the short-wave infrared (SWIR) (1-2.5 µm) wavelength range and also in the long-wave infrared (LWIR) (7.5-14 µm) wavelength range.

Another type of optical design for observing distant objects utilizes reflective elements (i.e., mirrors). However, many reflective optical designs include a central obscuration, which reduces the performance (e.g., resolution) of the image over certain frequencies. For example, in a Cassegrain design, two mirrors (a primary mirror and a secondary mirror) share a common optical axis, and the apertures are concentric to the optical axis, so that the secondary mirror, and the hole in the primary mirror, create an obscured aperture that reduces performance of the image over certain frequencies. The obscuration also reduces the light collection efficiency, requiring a larger overall aperture size (i.e., diameter) to achieve a given collection area of the aperture.

Some reflective optical designs do not include a central obscuration. One form of unobscured reflective optical design is known as a "Schiefspiegler" (literally "oblique mirror" in German), which was invented by Anton Kutter in the mid-20$^{th}$ Century. Generically, the Schiefspiegler is an unobscured two-mirror telescope where the two mirrors are tilted with respect to one another to help correct for aberrations. In the Schiefspiegler, only off-axis portions of the parent mirror shapes are used, which avoids the obscuration common with other reflective designs. However, to achieve acceptable performance, the reflective elements are spaced far apart to achieve flat focal planes. Also, to block stray light (i.e, off-axis light or light from outside the desired field of view), the entrance pupil may be spaced a significant distance from the primary mirror. Thus, the Shiefspiegler is too large for applications which require compactness, such as imaging systems mounted on aircraft or satellites. Another example of an unobscured reflective optical design is the three-mirror anastigmat (TMA) but, again, the presence of a third mirror leads to an optical design that is too large for certain applications. Additionally, such reflective designs do not easily support multiple imaging paths.

SUMMARY OF THE INVENTION

The present disclosure describes an optical system in which an aggressively compact reflective front end is combined with beam splitting elements and refractive relay optics to allow several imaging systems working in widely different wavelength bands to share a common aperture. The aggressively compact design results in significant field curvature at the uncorrected intermediate or virtual focus, which is corrected in the refractive relay optics.

Embodiments of the optical system may allow additional bands to be imaged using a larger aperture area than conventional designs. Also, the compact layout may allow packaging of individual optical paths above or below the reflective front end, whereas other designs do not easily support multiple imaging paths.

Furthermore, use of independent refractive relay optics for each band may provide a modular architecture that provides flexibility and supports future upgrades by allowing changes to be made to the relay optics or the sensor of one path without affecting the front end or any of the other paths.

In accordance with a first aspect, an optical system for a multispectral imaging apparatus is provided. The optical system includes a primary mirror and a secondary mirror. The primary mirror includes a concave reflecting surface that is an off-axis portion of a first mirror shape having a first optical axis. The secondary mirror includes a convex reflecting surface oriented to receive light reflected from the concave reflecting surface of the primary mirror. The convex reflecting surface is an off-axis portion of a second mirror shape having a second optical axis laterally offset and tilted relative to the first optical axis. The optical system further includes a first beam splitter oriented to receive light from the secondary mirror, the first beam splitter being configured to direct a first spectral band along a first path, and to direct a second spectral band along a second path. The optical system further includes first refractive relay optics including a first plurality of refractive elements having respective optical axes oriented along the first path, and second refractive relay optics including a second plurality of refractive elements having respective optical axes oriented along the second path. The optical system further includes a first sensor positioned to receive light in the first spectral band from the first plurality of refractive elements, and a second sensor positioned to receive light in the second spectral band from the second plurality of refractive elements. The primary and secondary mirrors are configured such that a ratio of an equivalent diameter of an aperture of the primary mirror to the separation between the primary and secondary mirrors is greater than or equal to 0.75. Furthermore, the first and second refractive relay optics are configured to correct aberrations in the first and second paths formed by the primary and secondary mirrors so that the first and second paths focus on the first and second sensors, respectively.

In an embodiment, the first beam splitter may be configured to direct second and third spectral bands along second and third paths that are coincident, and the optical system further includes a second beam splitter oriented to receive the second and third spectral bands from the first beam splitter and to direct the second and third spectral bands in different directions such that the second and third paths are no longer coincident. In this embodiment, the optical system may also include a third plurality of refractive elements having respective optical axes oriented along the third path, and a third sensor oriented to receive light in the third spectral band from the third plurality of refractive elements. Additionally, respective fields of view of the first, second, and third paths may be different. Furthermore, the respective fields of view may use different portions of the primary mirror. Also, respective focal lengths of the first, second, and third paths may be different. Further still, respective entrance pupils for the first, second, and third paths may be located at different positions along the optical axis of the system. Also, two or more respective entrance pupils for the first, second, and third paths may be located at the same position along the optical axis of the system. The system may be configured to capture and image at least the first, second, and third spectral bands simultaneously.

In an embodiment, the first beam splitter may be may oriented to cause the first path to extend under the primary mirror. In this embodiment, the first sensor may be disposed behind the primary mirror, and the optical system may further include a first fold mirror arranged along the first path and oriented to redirect the first path behind the primary mirror to the first sensor. Additionally, the first beam splitter may be oriented to cause the second and third paths to extend rearwardly towards a second fold mirror adjacent the secondary mirror, and the second fold mirror may be oriented to direct the second and third paths under the primary mirror. Further still, the second beam splitter may be disposed below the primary mirror along the second and third paths, and the second beam splitter may be oriented to direct the second path rearwardly relative to the primary mirror and to direct the third path downwardly relative to the primary mirror. Additionally, the optical system may include a third fold mirror below and behind the primary mirror, the third fold mirror being oriented to direct the second path upwardly behind the primary mirror to the second sensor. The optical system may also include a fourth fold mirror below the second beam splitter, the fourth fold mirror being oriented to direct the third path rearwardly relative to the primary mirror. The optical system may further include a fifth fold mirror below and behind the primary mirror, the fifth fold mirror being oriented to direct the third path upwardly behind the primary mirror to the third sensor. Furthermore, the first, second, and third paths may be angularly spaced from one another behind the primary mirror.

In an embodiment, the primary mirror shape is parabolic and the secondary mirror shape is hyperbolic.

In an embodiment, a refractive element of one of the first, second, or third pluralities of refractive elements is configured to refract stray light in a corresponding one of the first, second, or third spectral bands so as not to pass through a successive refractive element.

In an embodiment, an aperture stop may be disposed between one of the first, second, or third pluralities of refractive elements and a corresponding one of the first, second, or third sensors to reduce stray light entering the apparatus.

An example embodiment of the invention is described below with reference to the following drawing figures, in which like reference numerals in the various figures are utilized to designate like components.

DESCRIPTION OF EXAMPLE EMBODIMENTS

Figure 1:
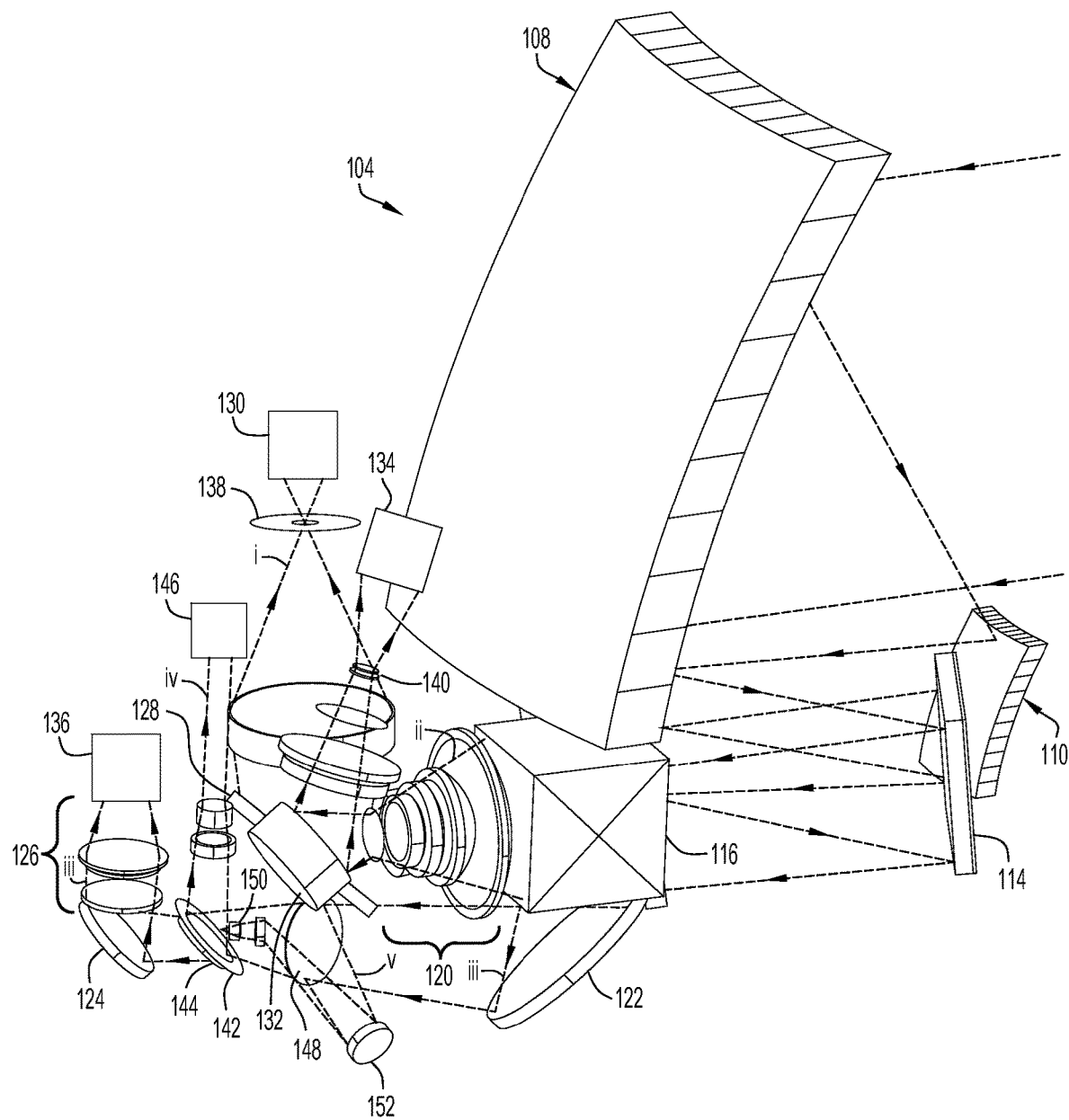
FIG. 1 is a perspective view of a multispectral imaging apparatus having an unobscured two-mirror catadioptric optical system according to an example embodiment.

This disclosure relates to an optical system comprising an unobscured reflective telescope front end, combined with refractive relay optics, to form an image on an appropriate sensor. This makes the overall optical design catadioptric (i.e. having a combination of reflective and refractive powered optical elements) for each imaging path. The system can be used for a single imaging path, but a significant advantage of this system is that it can be used for multispectral imaging. Because the first two elements are reflective, they do not impart any chromatic aberrations, so the reflective front end may be shared by multiple wavelength bands. One or more beam splitting optical elements may be used to separate the different wavelength bands into different imaging paths, and each band/path may have its own set of refractive relay optics. The separate relay paths can be configured to create well-corrected images on sensors appropriate for each wavelength band, allowing a more compact and modular design.

The unobscured reflective telescope front end is a novel variant of the "Schiefspiegler" design comprising a concave primary mirror and a convex secondary mirror. The primary and secondary mirrors are off-axis portions of concave and convex parent mirror shapes, respectively. The primary and secondary mirrors are placed extremely close together, making the imaging system much more compact than conventional designs. The optical axis of the secondary parent mirror shape is offset and tilted slightly, compared to the optical axis of the primary parent mirror shape, which allows the focal plane to be orthogonal to the chief or center ray of an incoming on-axis ray bundle, which simplifies the design of the relay optical paths.

The optical system described herein is suitable for use in a variety of multispectral imaging applications. For purposes of illustration, an example embodiment of the optical system for use in a multispectral thermal imaging system is described. The imaging paths in the example embodiment include short-wave infrared (SWIR), mid-wave infrared (MWIR), and long-wave infrared (LWIR) bands. However, it will be appreciated that the optical system may include other wavelength bands, for example visible and/or far-infrared wavelength bands. Furthermore, while an example embodiment of the optical system is described in the context of an imaging pod configured to be mounted on a gimbal on the exterior of an aircraft, it will be appreciated that the optical system may be configured for use in other types of apparatuses. For example, the optical system may be incorporated into spacecraft, satellites, and drones.

Example embodiments of the optical system have several advantages over existing designs, such as primarily refractive designs. This invention provides a means to package imaging sensors working in at least three separate bands within the constraints of a typical airborne imaging pod, while using a larger aperture area than previous designs. As shown in the Figures, the compact layout of this invention allows packaging of optical paths either above or below the telescope, whereas a TMA requires all paths to follow the flow of the three mirrors.

FIG. 1 illustrates an example embodiment of a multispectral imaging apparatus 100 according to the invention. As described in greater detail below, the optical system 104 includes an unobscured two-mirror reflective front end in which the primary and secondary mirrors 108 and 110 are more closely spaced than in conventional designs, making it significantly more compact. Because the front end is more compact, significant field curvature is present in the uncorrected intermediate focal plane formed by the reflective optics. The compact reflective front end may be combined with beam splitting optics and separate refractive relay optics to form separate imaging paths for multiple different wavelengths or wavelength bands. In the example embodiment illustrated in FIG. 1, the separate imaging paths are for SWIR, MWIR, and LWIR wavelength bands. The refractive relay optics may be designed to correct the aberrations present in the intermediate focal plane formed by the reflective optics and to achieve different focal lengths and fields of view for the individual imaging paths.

It will be appreciated that the optical system 104 may be disposed within a housing (not shown) having any suitable shape (e.g., spherical), and an optional window 106 may be positioned in an aperture on a front of the housing. Window 106 may be formed of a material capable of transmitting light spectra of interest (e.g., visible light, far-IR, SWIR, MWIR, and/or LWIR) so that light from outside the housing may be transmitted to the optical system 104 disposed in the housing. In certain other applications, such as in space, a window may not be needed.

The height and width of the window 106 are preferably about the same as the effective height and width of the primary mirror 108 when viewed from the front. This helps reduce stray (i.e., off-axis) light entering the system.

The optical system 104 will now be described in greater detail with reference to FIGS. 1 and 2. As noted above, the optical system 104 includes an unobscured two-mirror reflective front end that includes a concave primary mirror 108 and a convex secondary mirror 110. The primary mirror 108 includes a concave reflecting surface oriented to receive light that enters the housing through the window 106. The concave reflecting surface is an off-axis portion of a first mirror shape having a first optical axis. In a preferred embodiment, the first mirror shape is parabolic. In the example embodiment, the primary mirror 108 is a rectangular off-axis portion of the first mirror shape with a height longer than its width when viewed from the front to provide a compact profile. The primary mirror 108 is preferably vertically aligned with the window 106 such that light entering the optical system 104 from a distant object via the window 106 is generally parallel to and laterally offset from the first optical axis.

The secondary mirror 110 is offset from the primary mirror 108 in a lateral direction relative to the first optical axis and includes a convex reflecting surface oriented to receive light reflected from the concave reflecting surface of the primary mirror. The convex reflecting surface of the secondary mirror 110 is an off-axis portion of a second mirror shape having a second optical axis laterally offset and tilted relative to the first optical axis. For example, the second optical axis may tilt downwardly in a rearward direction (unless specified otherwise, the term rearward means towards a rear of the housing, and the term forward means towards a front of the housing). In a preferred embodiment, the second mirror shape is hyperbolic, although it can be higher order aspheres or freeform. In an embodiment, the secondary mirror 110 may be a rectangular off-axis portion of the second mirror shape with a width smaller than the width of the primary mirror 108 to provide space for other optical components on one or both sides of the secondary mirror within the width of the primary mirror.

It has been found that the optical system 104 can be made significantly more compact than conventional designs if the spacing between the primary and secondary mirrors 108 and 110 is such that the ratio of the equivalent diameter of the aperture to the separation between the primary and secondary mirrors is greater than or equal to 0.75. For an aperture that is circular, the equivalent diameter corresponds to the diameter of the aperture. For an aperture that is not circular, e.g., a rectangular aperture, the equivalent diameter corresponds to the diameter of a circle with the same area as the actual area of the non-circular aperture. For example, if the equivalent diameter of the aperture is 150 mm and the separation between the mirrors is 150 mm, the "compactness ratio" would be 1.0, which is greater than 0.75 In such a system, aberrations such as field curvature are present in the uncorrected intermediate (i.e., virtual) focal plane formed by the primary and secondary mirrors. However, because the optical axis of the secondary parent mirror shape is offset and tilted slightly, compared to the optical axis of the primary parent mirror shape, the focal plane can be orthogonal to the chief or center ray of an incoming on-axis ray bundle, simplifying the opto-mechanical design.

Imaging paths for different wavelengths, or wavelength bands, can be formed using beam splitters, including but not limited to dichroic beam splitters (which have optical interference coatings designed to reflect certain wavelengths but transmit other wavelengths). A simple layout shows a first beam splitter 112 is disposed below the primary mirror 108 in the path of light from the secondary mirror 110. The first beam splitter 112 is configured to pass a first spectral band and reflect other spectral bands (which may include one, two, or more spectral bands of interest). In the example embodiment, the first beam splitter 112 is oriented to direct the first spectral band along a first path i extending rearwardly to a first group of refractive relay optics or lenses 118 under the primary mirror 108 and having their respective optical axes oriented along the first path, and to reflect second and third spectral bands along second and third paths ii, iii extending forwardly and at an angle (relative to the path of light from the secondary mirror) towards a first fold mirror 114 disposed to one side of the secondary mirror 110.

The first fold mirror 114 is oriented to reflect the second and third paths ii and iii in a rearward direction generally parallel to the first path i towards a second beam splitter 116 below the primary mirror 108. The second beam splitter 116 is positioned to receive the second and third spectral bands from the first beam splitter 112 via first fold mirror 114, and is oriented to pass the second spectral band and to reflect the third spectral band. In the example embodiment, the second beam splitter 116 is oriented to direct the second imaging path ii (i.e., the second spectral band) rearwardly to a second group of refractive relay optics or lenses 120 behind the primary mirror 108 and having their respective optical axes oriented along the second path, and to direct the third path iii (i.e., the third spectral band) downwardly relative to the primary mirror 108 to a second fold mirror 122 below the primary mirror. The second fold mirror 122 is oriented to direct the third path iii rearwardly and inwardly (relative to a central vertical plane of the housing) to a third fold mirror 124 behind and below the primary mirror 108. It will be appreciated that, by tilting the third path iii inwardly, it may remain within a width envelope or footprint of the primary mirror, thereby contributing to compactness of the optical system.

The third fold mirror 124 is oriented to reflect the third path iii upwardly to a third group of refractive relay optics or lenses 126 disposed behind the primary mirror 108 and having their respective optical axes oriented along the third path. A fourth fold mirror 128 is positioned in the first path i, after the first group of refractive relay optics 118, and is oriented to reflect the first path vertically upward to a first sensor 130 behind the primary mirror 108. A fifth fold mirror 132 is positioned in the second path ii, after the second group of refractive relay optics 120, and is oriented to reflect the second path upwardly to a second sensor 134. A third sensor 136 is positioned in the third path iii after the third group of refractive relay optics 126.

It will be appreciated that the aggressively compact design of the reflective front end of the optical system 104 makes it difficult to control stray light in that portion of the system because there is little room for baffles. In addition to baffles, as best seen in FIGS. 1 and 2, aperture stops 138, 140, and 142 may be disposed along the first, second, and third paths, respectively, after the reflective front end to control stray light.

It will be appreciated that the individual optical paths (e.g., paths i, ii, and iii) can have different effective focal lengths and fields of view, even though they share a common reflective front end. The different effective focal lengths are achieved through the design of the refractive relay optics. The focal lengths, combined with the physical sizes of the sensors/sensors, determine the FOVs.

Though the front end reflective telescope is achromatic, it is not free of aberrations. In particular, significant field curvature is present in the (intermediate or virtual) focal plane formed by the reflective front end optics described herein. The first, second, and third groups of refractive relay optics 118, 120 and 126 each include a plurality of refractive elements or lenses configured to correct for aberrations in the first, second, and third imaging paths i, ii, and iii, while achieving the desired focal length and FOV for each sensor. Thus, the imaging paths may focus properly on the first, second, and third sensors, respectively.

Figure 2:
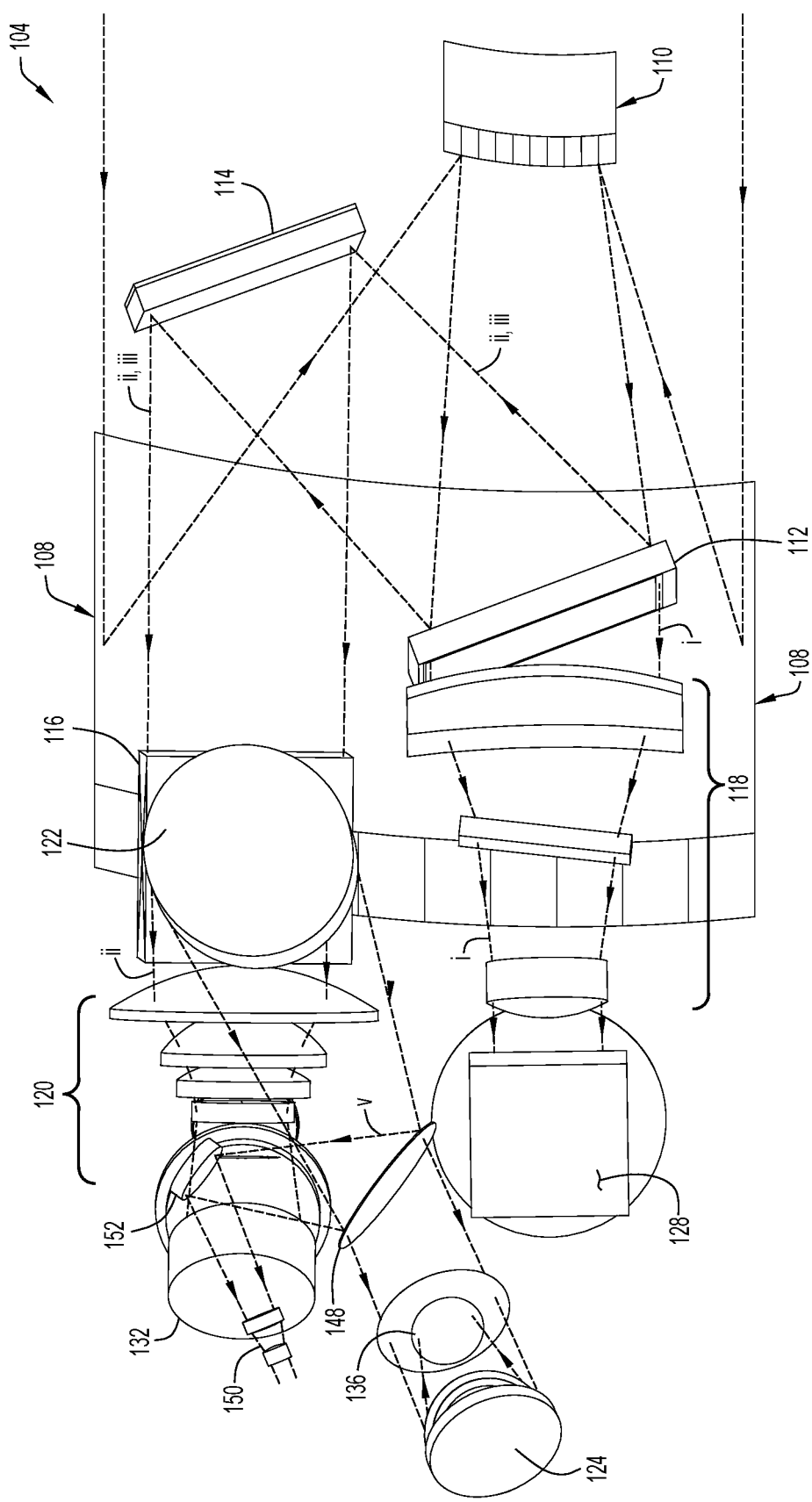
FIG. 2 is a bottom view of the optical system in the multispectral imaging apparatus of FIG. 1.

Also shown in FIGS. 1 and 2 are two optional additional paths in one of the bands (see, e.g., optional path iv formed by beamsplitter 144 that leads to sensor 146, and optional path v formed by beamsplitter 148 that leads to sensor 150 via fold mirror 152). In the case of multiple paths in a single band, switching from one path to another can be done using a moving element (e.g., a mirror which moves in and out of position) rather than a beam splitter.

Figure 3:
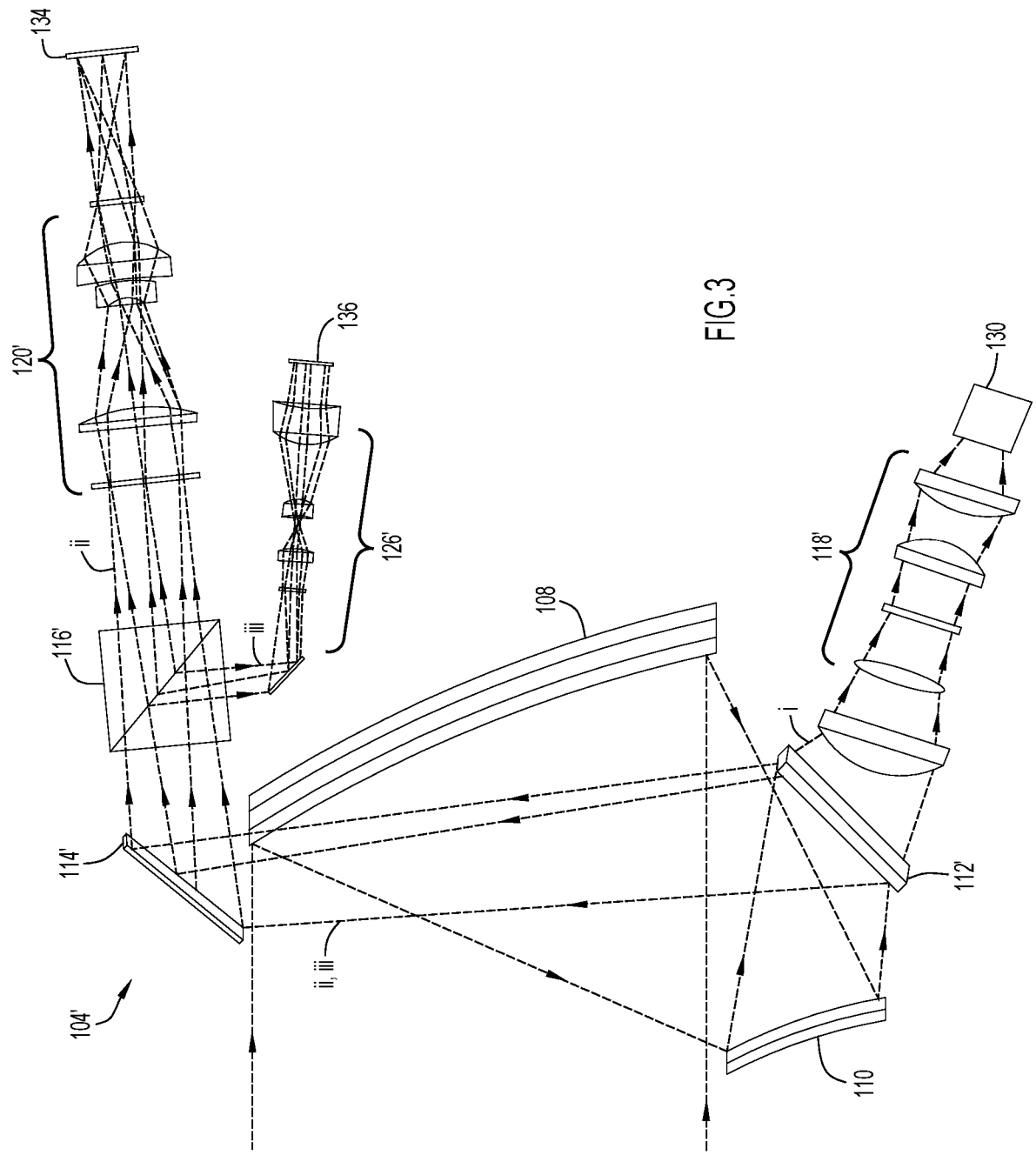
FIG. 3 is a schematic diagram of an unobscured two-mirror catadioptric optical system according to another example embodiment.

FIG. 3 is a schematic diagram illustrating another example of an unobscured multispectral optical system 104'. The optical system 104' is similar to optical system 104 in that it includes primary and secondary mirrors 108 and 110 arranged in the same aggressively compact manner as described above, but the first beam splitter 112' in the optical system of FIG. 4 reflects the second and third imaging paths ii and iii upwardly instead of rearwardly. Also, the first fold mirror 114' in the optical system of FIG. 3 is disposed above the primary mirror 108, instead of to the side of the secondary mirror 110, to reflect the second and third imaging paths over the top of the primary mirror. Furthermore, in the optical system 104', none of the imaging paths are folded vertically behind the primary mirror 108. Instead, the imaging paths continue forwardly (relative to the direction of incoming light) in generally horizontal directions. The first imaging path i is focused on sensor 130 directly via refractive relay optics 118', the second imaging path ii is focused on sensor 134 via beamsplitter 116' (which is configured to pass the second spectral band) and refractive relay optics 120', and the third imaging path iii is focused on sensor 136 via beamsplitter 116' (which is configured to reflect the third spectral band downwardly) and refractive relay optics 126'. The first, second, and/or third paths may include aperture stops as described above to control stray light. Also, if desired, the third path can be split into multiple paths via appropriate beam splitters and/or fold mirrors.

Additionally, it should be noted that any of the paths in any layout may form an intermediate focus prior to encountering any refractive elements, or may include at least one refractive element prior to forming an intermediate focus. It will also be appreciated that, in the optical systems described herein, individual paths can have different entrance pupil locations. For example, the paths may have their entrance pupils at the primary mirror, which means that the rays from each field in those paths completely fill the primary mirror (or very nearly so). Alternatively, the entrance pupil may be placed before or after the primary mirror. Place the entrance pupil after the primary mirror may be advantagenous for large FOV systems.

It will be appreciated that the example embodiments described above and illustrated in the drawings represent only a few of the many ways of implementing the invention. Many modifications and variations will be apparent to those of ordinary skill in the art without departing from the scope and spirit of the invention. For example, an example embodiment is illustrated using an optical design which includes short-wave infrared (SWIR), mid-wave infrared (MWIR), and long-wave infrared (LWIR) imaging paths, but it will be appreciated that the optical design could include other wavelength bands, for example visible and/or far-infrared wavelength bands, in addition to or in place of the SWIR, MWIR, and LWIR bands. There are also many ways to arrange the beam splitting optics and flat fold mirrors, in order to fit all the imaging paths, and their associated sensors, within the space available for a specific application. Thus, while a particular packaging example is used here for illustration, it will be appreciated that other packaging arrangements may be used. For example, all of the imaging paths may be directed above or below the primary mirror, or some of the imaging paths may be directed above the primary mirror while other imaging paths are directed below the primary mirror. Similarly, imaging paths may extend vertically upward or downward behind the primary mirror, or they may continue to extend rearwardly. Additionally, while the primary mirror is shown having a parabolic shape and the secondary mirror is shown having a hyperbolic shape, either or both mirror shapes can be modified using different conic constants and/or higher order aspheric terms, including but not limited to freeform surfaces. In addition, the relay lenses may be spherical, rotationally symmetric aspheres, or freeforms, and the relay lenses may have optical axes coincident with the optical axis of its path, or be decentered and/or tilted from the optical axis of its path. It will also be appreciated that the modular nature of the optical system disclosed herein can support improvement to jitter control, e.g., by adding a fast steering mirror (FSM) in place of one or more of the fold mirrors in the relay paths

The invention claimed is:

1. An optical system for a multispectral imaging apparatus, the optical system comprising:
    a primary mirror including a concave reflecting surface, the concave reflecting surface being an off-axis portion of a first mirror shape having a first optical axis;
    a secondary mirror including a convex reflecting surface oriented to receive light reflected from the concave reflecting surface of the primary mirror, the convex reflecting surface being an off-axis portion of a second mirror shape having a second optical axis laterally offset and tilted relative to the first optical axis;
    a first beam splitter oriented to receive light from the secondary mirror, the first beam splitter being configured to direct a first spectral band along a first path, and to direct a second spectral band along a second path;

first refractive relay optics including a first plurality of refractive elements having respective optical axes oriented along the first path;
second refractive relay optics including a second plurality of refractive elements having respective optical axes oriented along the second path;
a first sensor positioned to receive light in the first spectral band from the first plurality of refractive elements;
a second sensor positioned to receive light in the second spectral band from the second plurality of refractive elements;
wherein the primary and secondary mirrors are configured such that a ratio of an equivalent diameter of an aperture of the primary mirror to the separation between the primary and secondary mirrors is greater than or equal to 0.75; and
wherein the first and second refractive relay optics are configured to correct aberrations in the first and second paths formed by the primary and secondary mirrors so that the first and second paths focus on the first and second sensors, respectively.

2. The optical system of claim 1, wherein the first beam splitter is configured to direct second and third spectral bands along second and third paths that are coincident, and further comprising a second beam splitter oriented to receive the second and third spectral bands from the first beam splitter and to direct the second and third spectral bands in different directions such that the second and third paths are no longer coincident.

3. The optical system of claim 2, further comprising a third plurality of refractive elements having respective optical axes oriented along the third path, and a third sensor oriented to receive light in the third spectral band from the third plurality of refractive elements.

4. The optical system of claim 1, wherein the first beam splitter is oriented to cause the first path to extend under the primary mirror.

5. The optical system of claim 4, wherein the first sensor is disposed behind the primary mirror, and further comprising a first fold mirror arranged along the first path and oriented to redirect the first path behind the primary mirror to the first sensor.

6. The optical system of claim 5, wherein the first beam splitter is oriented to cause the second and third paths to extend rearwardly towards a second fold mirror adjacent the secondary mirror, the second fold mirror being oriented to direct the second and third paths under the primary mirror.

7. The optical system of claim 6, wherein the second beam splitter is disposed below the primary mirror along the second and third paths, and wherein the second beam splitter is oriented to direct the second path rearwardly relative to the primary mirror and to direct the third path downwardly relative to the primary mirror.

8. The optical system of claim 7, further comprising a third fold mirror below and behind the primary mirror, the third fold mirror being oriented to direct the second path upwardly behind the primary mirror to the second sensor.

9. The optical system of claim 8, further comprising a fourth fold mirror below the second beam splitter, the fourth fold mirror being oriented to direct the third path rearwardly relative to the primary mirror.

10. The optical system of claim 9, further comprising a fifth fold mirror below and behind the primary mirror, the fifth fold mirror being oriented to direct the third path upwardly behind the primary mirror to the third sensor.

11. The optical system of claim 10, wherein the first, second, and third paths are angularly spaced from one another behind the primary mirror.

12. The optical system of claim 1, wherein the primary mirror shape is parabolic and the secondary mirror shape is hyperbolic.

13. The optical system of claim 1, wherein a refractive element of one of the first, second, or third pluralities of refractive elements is configured to refract stray light in a corresponding one of the first, second, or third spectral bands so as not to pass through a successive refractive element.

14. The optical system of claim 1, further comprising an aperture stop disposed between one of the first, second, or third pluralities of refractive elements and a corresponding one of the first, second, or third sensors to reduce stray light entering the apparatus.

15. The optical system of claim 3, wherein respective fields of view of the first, second, and third paths are different.

16. The optical system of claim 15, wherein the respective fields of view use different portions of the primary mirror.

17. The optical system of claim 16, wherein respective focal lengths of the first, second, and third paths are different.

18. The optical system of claim 16, wherein respective entrance pupils for the first, second, and third paths are located at different positions along the optical axis of the system.

19. The optical system of claim 16, wherein two or more respective entrance pupils for the first, second, and third paths are located at the same position along the optical axis of the system.

20. The optical system of claim 3, wherein the system is configured to capture and image at least the first, second, and third spectral bands simultaneously.

* * * * *